Patented Feb. 5, 1952

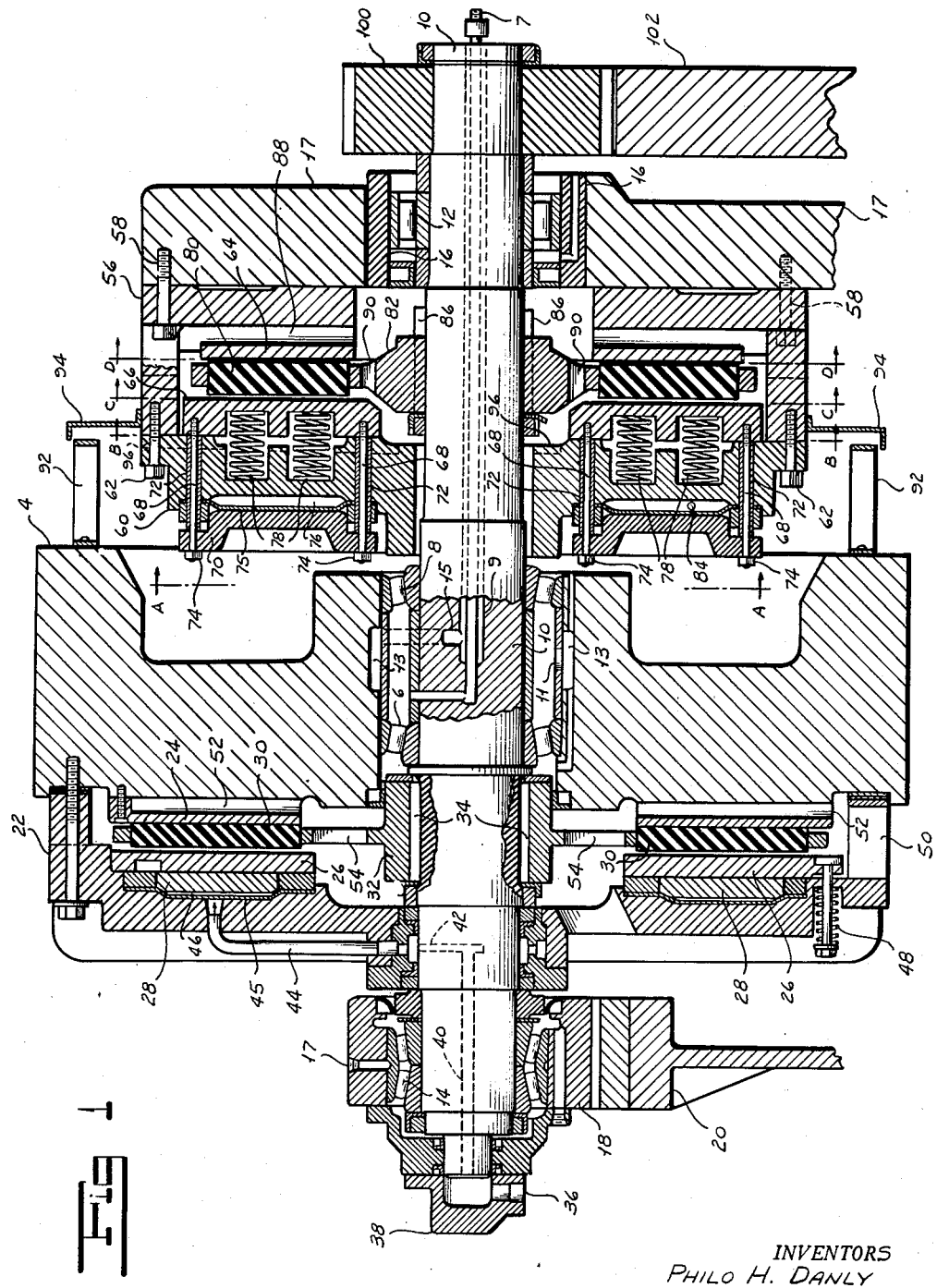

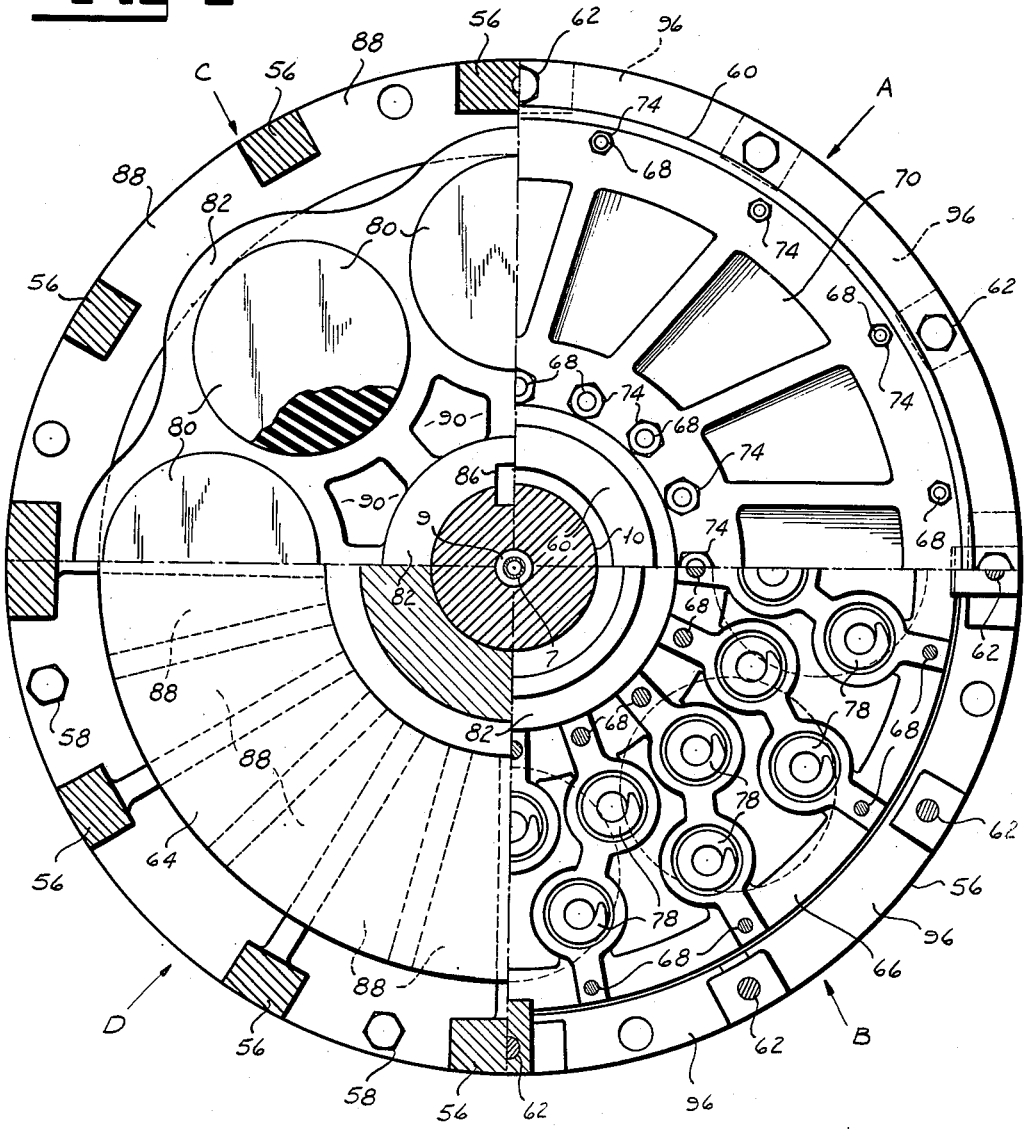

2,584,191

UNITED STATES PATENT OFFICE 2,584,191

BRAKE ASSEMBLY FOR PRESSES

Philo H. Danly, Hinsdale, George I. Danly, Elmhurst, and Vasil Georgeff, Chicago, Ill., assignors to Danly Machine Specialties, Inc., Chicago, Ill., a corporation of Illinois Application March 19, 1949, Serial No. 82,422

1 Claim. (Cl. 188—170)

Our invention relates to fluid pressure operated brake assemblies for presses, and more particularly to an improved brake assembly for power presses in which the brake is set by springs and released by fluid pressure against the action thereof.

This application is an improvement over our copending application, Serial No. 783,745, filed November 3, 1947.

In most brake assemblies of the prior art the working parts of the brake normally rotate when the clutch is in connected position. A brake disk secured to a stationary part of the assembly is adapted to be grabbed by the brake parts whenever the brake is set. The additional energy consumed in bringing the heavy parts up to speed is then dissipated in the form of heat in stopping their rotation by means of the brake. It is common practice in power presses to employ a continuously running motor driving a flywheel which is adapted to be clutched to and unclutched from the gear train driving an eccentric or crank. The arrangement is such that the ram and associated drive are brought to rest and immobilized by a brake when the drive is unclutched from the flywheel. Since large amounts of energy must be handled the friction involved, especially in large presses, is high. This friction stops the press when the clutch is disengaged and the brake set. In the construction shown in our copending application, Serial No. 783,745, we have shown a construction in which the heat caused by friction is adapted to be dissipated by continuously circulating air. We employ a brake construction having a pair of brake shoes mounted between a stationary brake plate and a movable brake plate. The stationary brake plate takes the form of a brake ring coacting with a circular brake shoe. The movable brake plate takes the form, in our previous construction, of a ring adapted to engage a movable brake shoe. The brake shoes were provided with rounded bearing surfaces designed to permit the equalization of pressure in event of distortion of either of the brake rings.

We have found that with heavy pressures in the case of large presses there is a tendency for the brake rings which engage the brake shoes to dish, and that in such cases the structure becomes complicated when the parts are made heavy enough to withstand the pressures involved.

One object of our invention is to provide an improved brake assembly in which the mass of the brake parts which must be started and stopped is greatly reduced and of simplified construction.

Another object of our invention is to provide an improved assembly in which the brake parts are continuously cooled by circulated air and having a simplified construction.

Another object of our invention is to provide an improved brake assembly of simplified construction in which the brake linings will automatically equalize their wear.

Another object of our invention is to provide a simple, sturdy and efficient construction for an improved brake assembly for power presses.

Other and further objects of our invention will appear from the following description.

In the accompanying drawings which form part of the instant specification and which are to be read in conjunction therewith, and in which like reference numerals are used to indicate like parts in the various views:

Figure 1 is a sectional elevation through a power press flywheel showing the clutch assembly and a brake assembly embodying our invention.

Figure 2 is a multiquarter sectional view taken along the lines A—A, B—B, C—C and D—D of Figure 1, the respective quarter sections being indicated generally in Figure 2 by the reference letters A, B, C and D.

In general, our invention contemplates the mounting of a brake disk upon a press shaft for rotation therewith. The working parts of the brake structure are mounted in a brake housing immobilized to the press frame in any appropriate manner so that it will always remain stationary. In this manner it is not necessary to start and stop the larger mass of the working parts of the brake structure since only the brake disk rotates when the brake is released. By this construction we are enabled to save the amounts of energy normally wasted in bringing the heavy masses which comprise the brake structure up to speed and then having to stop them. The brake disk is provided with a plurality of openings in which we loosely position disks of lining material, the construction being such that the individual disks are free to rotate and equalize their wear. Then too, we provide a system of lubrication so that all the bearings may be easily lubricated. The flywheel is provided with fan blades adapted to circulate air through air passages formed in the stationary brake structure and thus continuously cool it. The brake housing is mounted adjacent the flywheel and is provided with a fluid pressure actuated means adapted to release the brake against the action of a plurality of springs which normally urge the movable brake plate to braking position by clamping the brake disk between a stationary brake plate and the movable brake plate. The springs in our improved construction are positioned centrally of the brake plate and thus avoid the tendency to dish it. Similarly, the springs thrust against the brake housing centrally thereof and we are thereby enabled to eliminate the tendency to dish the brake housing. Furthermore, by positioning the springs centrally of the movable brake plate instead of adjacent its periphery as shown in our copending application we may employ a plurality of springs and thus distribute the thrust over a greater area and avoid local stresses which were the cause of dishing action.

More particularly, referring now to the drawings, a flywheel 4 is mounted on a pair of roller bearings 6 and 8 which are supported by a shaft 10 which is rotatably mounted in a pair of bearings 12 and 14. A pillow block 16 supported by press frame 17 carries bearing 12. A pillow block 18 supported by the press frame 20 carries bearing 14. A clutch housing 22 is secured to the flywheel 4 for rotation therewith and includes a stationary clutch plate 24 and a movable clutch plate 26. An annular piston 28 adapted to be moved by a fluid pressure sets the clutch to clamp clutch disks 30 between the stationary clutch plate 24 and the movable clutch plate 26. The clutch disks are carried by a clutch member 32 which is secured by splines 34 to the shaft 10 for rotation therewith while permitting a small degree of axial movement. A fluid medium under pressure for the operation of the clutch is adapted to be introduced through the opening 36 in cap member 38, whence it flows through axial duct 40 formed in the shaft 10, through cross duct 42 through pipe 44 to the annular cylinder 46 in which the annular piston 28 is situated. Springs 48 serve to urge the movable clutch plate 26 to releasing position when the fluid pressure behind the piston 28 is released. Centrifugal fan buckets 50 formed in the clutch housing 22 draw air through cooling passages 52 formed in the clutch structure, there being openings 54 formed in the clutch member 32 to permit the passage of air.

The brake housing is formed with a main body portion 56 which is secured to the press frame 17 by means of stud bolts 58. A brake housing cover 60 is secured to the housing 56 by means of stud bolts 62. The interior of the brake housing 56 is formed with a stationary brake plate 64. An annular movable brake plate 66 is supported by a plurality of bolts 68 which are threadedly secured to the movable brake plate 66. The other ends of the bolts 68 pass through an annular piston 70. The bolts 68 are lodged within bushings 72 extending between the annular piston 70 and the movable brake plate 66. Nuts 74 draw the annular piston 70 to the right as viewed in Figure 1 and thus clamp the bushings 72 between the annular piston 70 and the movable brake plate 66. The annular piston 70 is lodged within an annular cylinder 76. A plurality of springs 78 are positioned in complementary reentrant portions formed in the brake housing cover 60 and in the movable brake plate 66. The arrangement is such that the springs will force the brake plate 66 to the right as viewed in Figure 1 to clamp brake disks 80 which are carried by the brake member 82 between the stationary brake plate 64 and the movable brake plate 66. Upon the introduction of air through opening 84 into the annular cylinder 76 the annular piston 70 is moved to the left as viewed in Figure 1 against the action of springs 78 to release the brake disks 80. The brake member 82 is secured to the shaft 10 by splines 86 so that the brake member is constrained to rotate with the shaft 10, but is free to move axially thereof through a short distance. It will be noted that the brake cylinder 76 is covered by a flexible ceiling diaphragm 75 and that the clutch cylinder 46 is covered with a flexible ceiling diaphragm 45. This permits the respective brake and clutch pistons to move under fluid pressure while maintaining a pressure tight seal and eliminating the necessity of piston rings.

The brake housing body member is formed with a plurality of air passages 88. Openings 90 are provided in the brake member 82 to permit the passage of air. Fan blades 92 are secured to the flywheel to form a centrifugal fan. A shroud 94 is secured to the brake housing 56 to prevent the short circuiting of air. The cover plate is provided with radially extending air passages 96 similar to the passages 88. This permits air to be drawn from the atmosphere to pass through passages 88 through openings 90 through radially extending openings 96 to be thrown outwardly by the fan 92. Since the fan rotates continuously with the flywheel 4 the brake structure is thus continuously cooled. The bearing 14 is lubricated by oil fed through the pillow block 18 through the opening 17. The flywheel bearings 6 and 8 are lubricated by oil fed through the pipe 7 passing through an axial bore 9 formed in the shaft 10. The oil is thrown out by centrifugal force and passes through an opening 11 into an annular collecting ring 13, whence it flows through duct 15 communicating with the bore 9 formed in the shaft. A pinion 100 is secured to the shaft 10 for rotation therewith and meshes with a gear 102 of the gear train of the press.

It will be seen that we have accomplished the objects of our invention. We have provided an improved assembly of simplified construction in which the brake parts of a power press brake are continuously cooled by circulating air. We have provided a brake assembly for power presses of simplified construction in which the brake linings will automatically equalize their wear. We have provided a power press brake of simple, sturdy, and efficient construction, in which large braking forces may be employed without distortion of comparatively light weight parts.

It will be understood that certain features and sub-combinations are of utility and may be employed without reference to other features or sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

A brake assembly including in combination a shaft, a frame, a brake housing carried by the frame, a cover for the housing, an annular stationary brake plate carried within the housing, an annular longitudinally movable brake plate carried within the housing, means for preventing relative rotation between the brake housing and the movable brake plate, the stationary brake plate being formed with radially extending passageways, said cover member being formed with radially extending passageways adjacent the movable brake plate, a brake disk secured to the shaft for rotation threwith and positioned between the brake plates, springs positioned between the housing and the movable brake plate adapted to clamp the brake disk between the brake plates to immobilize the brake disk, means for moving the movable brake plate against the action of the springs to release the brake disk, apertures formed in the brake disk, friction blocks movably positioned in the apertures between the brake plates, and means for continuously passing air through said radially extending passageways whereby continuously to cool the brake plates.

PHILO H. DANLY.
GEORGE I. DANLY.
VASIL GEORGEFF.

REFERENCES CITED

The following references are of record in the file of this patent:

UNITED STATES PATENTS

| Number | Name | Date |
|---|---|---|
| 1,561,722 | Jimerson | Nov. 17, 1925 |
| 1,734,598 | Schramm | Nov. 5, 1929 |
| 2,095,094 | Glasner | Oct. 5, 1937 |
| 2,247,690 | Nutt | July 1, 1941 |
| 2,274,885 | Brown | Mar. 3, 1942 |
| 2,299,028 | Nutt et al. | Oct. 13, 1942 |
| 2,342,750 | Newell | Feb. 29, 1944 |